United States Patent Office 3,437,042
Patented Apr. 8, 1969

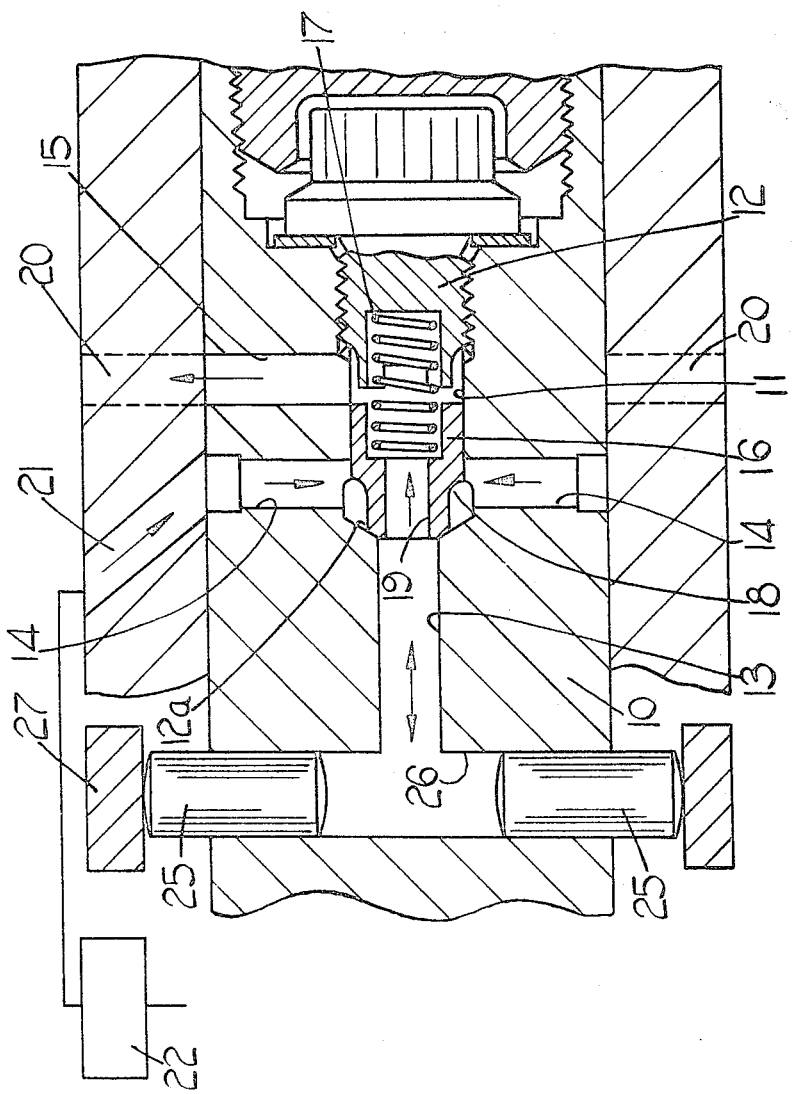

3,437,042
LIQUID FUEL PUMPING APPARATUS
Kenneth Albert Walters Kemp, London, England, assignor to C.A.V. Limited, London, England, a British company
Filed Aug. 24, 1967, Ser. No. 662,926
Claims priority, application Great Britain, Sept. 8, 1966, 40,113/66
Int. Cl. F04b 49/08, 13/02
U.S. Cl. 103—2                                    4 Claims

ABSTRACT OF THE DISCLOSURE

A liquid fuel pumping apparatus of the rotary distributor type having a valve for controlling the flow of fuel through an inlet passage to an injection pump, the valve being closed by differential pressures during an injection stroke of the apparatus, the pressure of fuel supplied through the inlet passage serving to open the valve to permit flow of fuel to the injection pump during a filling period.

---

This invention relates to non-return valves and has for its object to provide such a valve in a simple and convenient form.

A valve in accordance with the invention comprises a body part in which is defined a cylindrical bore, a first conduit extending from one end of said bore, a second conduit connecting with the bore intermediate its ends, an annular seating defined at said one end of the bore, a cylindrical valve member slidable axially within the bore, the valve member being shaped for co-operation with the seating, a step defined in the periphery of the valve member and against which fluid under pressure admitted to the bore through said second conduit can act to move the valve member away from the seating, and passage means through which fluid under pressure from the first conduit can act upon the end of the valve member remote from the seating.

One example of a valve in accordance with the invention will now be described with reference to the accompanying drawing which is a diagrammatic side elevation of part of a liquid fuel injection pump for supplying fuel to an internal combustion engine.

There is provided a body part 10 in which is formed a cylindrical bore 11 which is closed at one end by a plug 12. The end of the bore remote from the plug is shaped to define an annular seating 12a and extending axially from this end of the bore is a first conduit 13. Extending from the bore intermediate the ends thereof is a pair of second conduits 14 and extending from the end of the bore which is closed by the plug is a third conduit 15.

Within the bore is an axially movable valve member 16 and this is loaded towards the end of the bore remote from the plug by a coiled compression spring 17. The periphery of the valve member is shaped so as to define a step 18 and formed in the valve member is a passage 19, this passage being stepped to define an abutment for the spring 17. The arrangement is such that when the fluid pressure in the conduit 13 is below that pertaining in the conduits 14 and providing the latter pressure is high enough, then the valve member will be moved against the action of the spring due to the force developed by the fluid pressure acting on the step 18. When this occurs fluid can flow from the conduits 14 into the conduit 13. When the pressure in the conduit 13 rises, the force produced on the end of the valve member adjacent the plug forces the valve member onto the seating so preventing flow of fluid from the conduit 13 to the conduits 14.

Such a valve can be used in a liquid fuel pumping apparatus for supplying fuel to an internal combustion engine. In this case the body part 10 comprises a rotary distributing member which is driven in timed relationship with an engine with which the apparatus is associated. The third conduit 15 forms a delivery passage and communicates with each in turn of a plurality of outlet passages 20 which are in communication with nozzles respectively mounted so as to direct fuel into the combustion spaces respectively of the engine. The first conduit 13 is in communication with the outlet of an injection pump which comprises a pair of pumping plungers 25 mounted within a bore 26 formed in the distributing member and a cam ring 27 surrounding the distributor at this point. The cam ring is provided with a plurality of pairs of cam lobes on its internal periphery and as the distributing member is rotated the plungers will be moved inwardly to displace fuel through the conduit 15. During the filling periods of the injection pump fuel flows to the conduits 14 from a feed pump (not shown) by way of a passage 21 and the quantity of fuel which flows into the injection pump is controlled by a throttle 22.

Having thus described my invention what I claim as new and desire to secure by Letters Patent is:

1. A liquid fuel pumping apparatus for supplying fuel to internal combustion engines and comprising in combination, a body part, an injection pump, a bore defined in said body part, a first conduit extending from one end of said bore and through which the bore is in communication with the output of the injection pump, a second conduit extending from the wall of the bore intermediate the ends thereof, said second conduit in use, being in communication with a source of liquid fuel at a low pressure, a third conduit extending from the other end of the bore, and through which fuel delivered by the injection pump flows to an outlet of the apparatus, a valve seating defined in the bore, a resiliently loaded valve member slidable in the bore for co-operation with said seating, the periphery of said valve member being stepped, and passage means through which the opposite ends of the bore are in communication with each other, the arrangement being such that during an injection stroke of the injection pump fuel at high pressure flows from the first to the third conduits through said passage means, and during a filling stroke the pressure of fuel in the second conduit causes the valve member to be lifted to permit fuel to flow from the second conduit to the first conduit.

2. A liquid fuel pumping apparatus as claimed in claim 1 in which the seating is defined about the point of entry of the first conduit into the bore, and said passage means is defined in the valve member.

3. A liquid fuel pumping apparatus as claimed in claim 2 including a throttle for controlling the rate at which fuel is supplied to the injection pump during the filling period.

4. A liquid fuel pumping apparatus as claimed in claim 3 in which the body part comprises a rotary distributor member mounted for rotation in a surrounding body and arranged to be driven in timed relationship with the engine with which the apparatus is associated, the third conduit constituting a delivery passage for registration in turn with a plurality of outlet passages formed in the body.

References Cited
UNITED STATES PATENTS 3,219,020  11/1965  Roosa _____ 103—2
3,289,590  12/1966  Hutcheon _____ 103—2
3,338,168  8/1967   Davis.
3,368,490  2/1968   Virello.

DONLEY J. STOCKING, Primary Examiner.
W. J. KRAUSS, Assistant Examiner.

U.S. Cl. X.R.
137—509; 103—41